Jan. 2, 1945.  T. J. C. CHAPMAN  2,366,666
AUTOMATIC CLAMPING DEVICE
Filed Jan. 7, 1942  4 Sheets-Sheet 1

Inventor
Thomas J. C. Chapman
By R. G. Story
Attorney

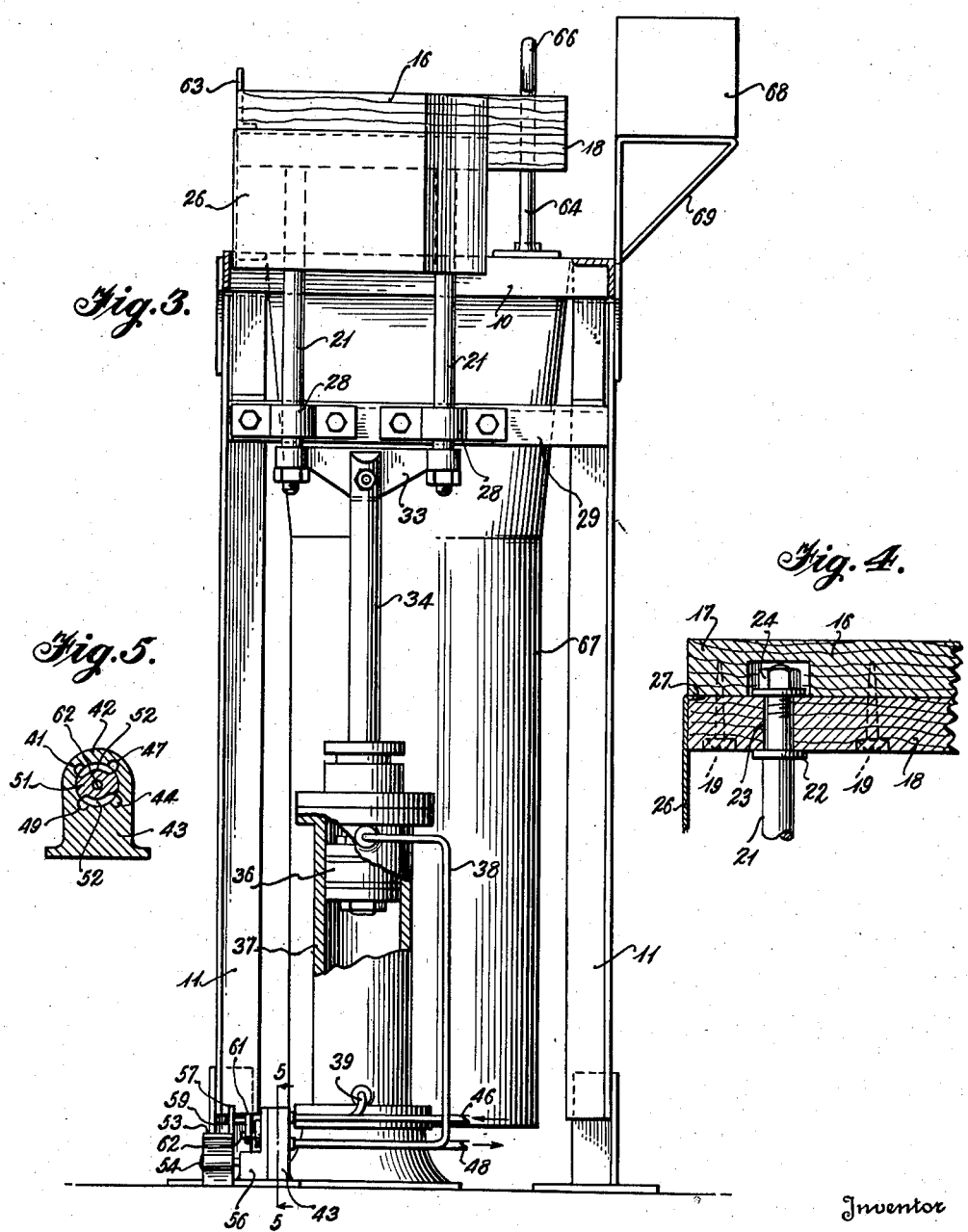

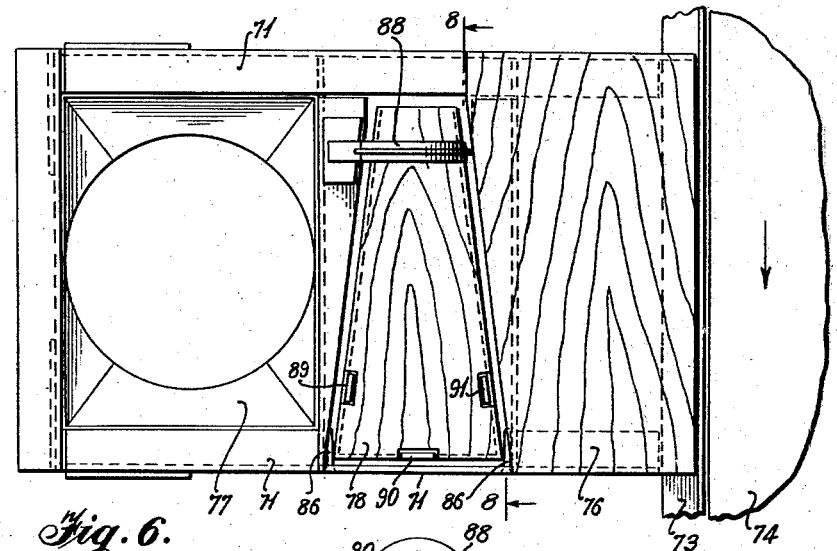

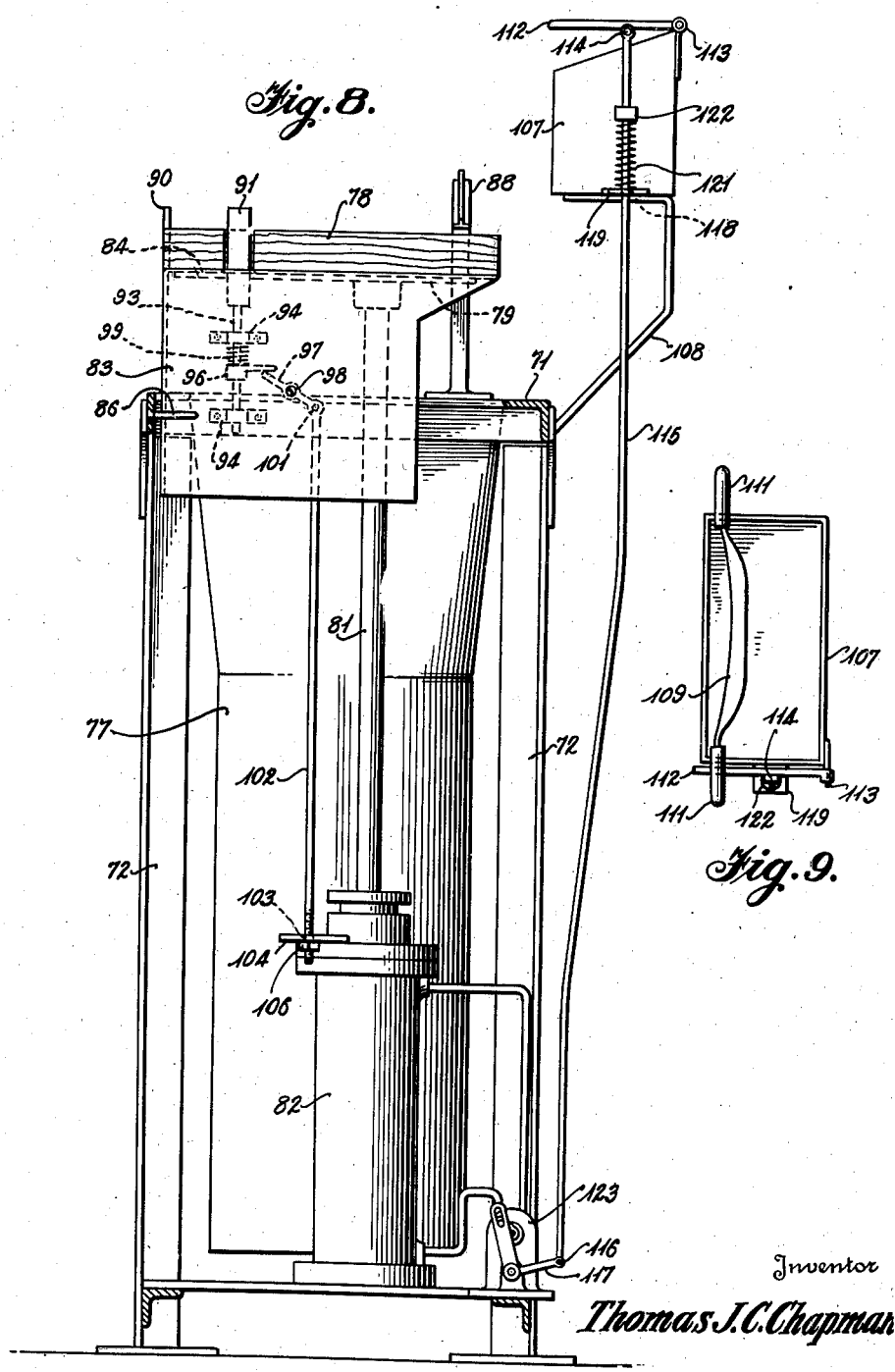

Patented Jan. 2, 1945

2,366,666

UNITED STATES PATENT OFFICE 2,366,666

AUTOMATIC CLAMPING DEVICE

Thomas J. C. Chapman, Chicago, Ill., assignor to Industrial Patents Corporation, Chicago, Ill., a corporation of Delaware Application January 7, 1942, Serial No. 425,909

10 Claims. (Cl. 17—1)

This invention relates to a clamping device and more particularly to a device enabling articles to be more easily handled and held in position while being worked upon.

The invention has particular utility in the handling and skinning of hams and will be specifically described with reference thereto. The most commonly employed device for skinning hams requires the operations of picking up a ham with both hands, raising it approximately eight inches and placing it in a saddle, in which position it remains while the operator removes the skin. It is then necessary for the operator to grasp the ham with both hands and place it aside.

With the device of the present invention the operator may slide the ham with one hand from a table or conveyor into position upon a skinning block. The skinning block is then raised by power under control of the operator into skinning position and at the same time the ham is clamped in position in order to enable the operator to remove the skin. The skinning block may then be lowered to its original position, unclamping the ham and enabling the operator to push the ham onto a table or conveyor with one hand. Power operation of the skinning block may be controlled by the foot of the operator or more desirably by some necessary movement of the operator such as placing a knife upon a support therefor and removing the knife from the support, so that he has both hands free for handling and skinning the ham.

It is therefore an object of the present invention to provide an improved handling and holding device for positioning and holding articles while the same are being worked upon.

Another object of the invention is to provide a clamping device for hams or the like during a skinning operation which relieves the operator of manually raising the hams into skinning position.

A further object of the invention is to provide an improved clamping and handling device for articles to be worked upon in which the article is raised to working position and clamped in such position by power under control of the operator.

A still further object of the invention is to provide a holding and clamping device for skinning or performing any other operation upon hams or the like in which the article is automatically raised to and clamped in working position when the operator removes a knife from a support therefor and lowered and released when the operator replaces the knife upon said support.

Other objects and advantages of the invention will appear in the following description of a preferred embodiment thereof illustrated in the following drawings of which Fig. 1 is a plan view of a device in accordance with the present invention with certain parts omitted;

Fig. 3 is a vertical section taken on the line 3—3 of Fig. 1;

Fig. 4 is a fragmentary enlarged vertical section taken on the line 4—4 of Fig. 1;

Fig. 5 is a vertical enlarged section through a control valve taken on the line 5—5 of Fig. 3;

Fig. 6 is a plan view of a modified device in accordance with the present invention with certain parts omitted;

Fig. 7 is a front elevation of the device of Fig. 6;

Fig. 8 is a vertical section taken on the line 8—8 of Fig. 6; and

Fig. 9 is a fragmentary plan view of the knife box shown in Fig. 8 with the knife in position therein.

Figure 1:
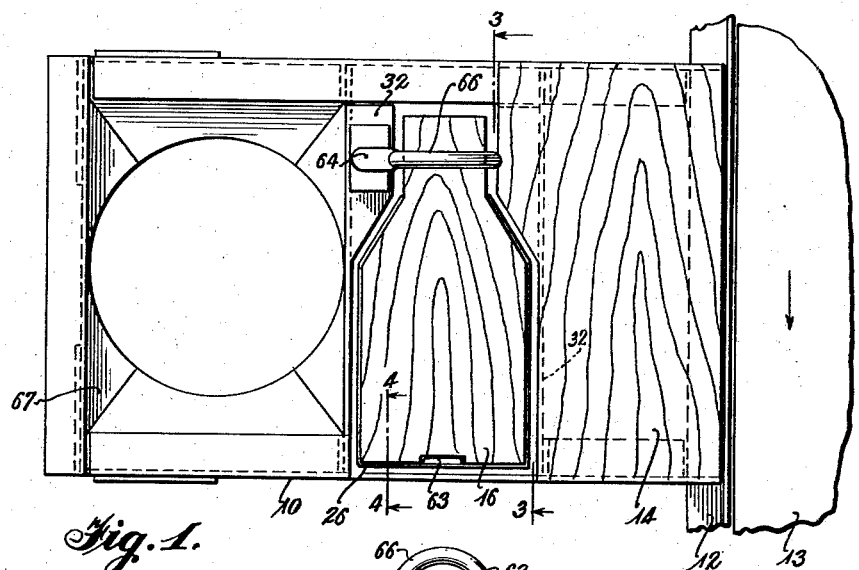

Referring to the drawings, the device of Figs. 1 to 5 includes a table 10 supported at one end by standards 11 and at the other end by any suitable support such as the side rail 12 of a conveyor having a conveying member 13 which may move in the direction of the arrow shown in Fig. 1. The table 10 may include a ham receiving portion 14 of any suitable material, for example wood.

Figure 2:
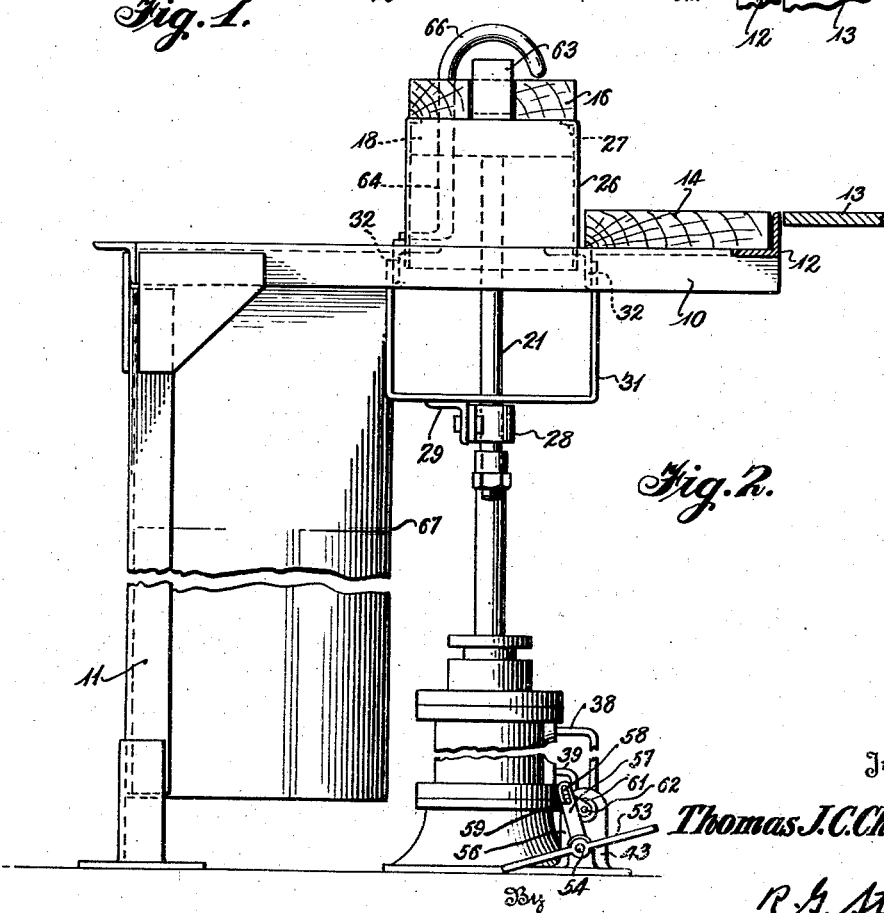
Fig. 2 is a front elevation of the device of Fig. 1.

The table 10 may also be provided with a skinning block 16 shown in its upper position in Figs. 2 and 3. In its lower position (not shown) the skinning block 16 preferably has its upper surface flush with the upper surface of the ham receiving portion 14 of the table 10. The portion 14 also preferably has its upper surface flush with the upper surface of conveying member 13 so that the ham or other article to be worked upon may be easily slid from the conveyor over the portion 14 onto the skinning block 16.

The structure of the skinning block 16 is most clearly shown in Fig. 4 and may include an upper member 17 which may be of wood or any other suitable material, and a lower member 18 which also may be made of wood or any other suitable material. The members 17 and 18 may be secured together by a plurality of fastening elements such as screws 19, two of which are shown in Fig. 4, and are supported upon vertical reciprocable rods 21, one of which is shown in Fig. 4. The rods 21 may be provided with shoulders 22 adjacent their upper ends bearing against the member 18 and projecting through apertures 23 in the member 18 so as to receive nuts 24 for clamping the rods to the member 18. With this construction the upper surface of the skinning block is free from apertures or fastening elements.

In order to prevent foreign material or the hands of the operator from entering the space beneath the skinning block 16 or being caught by the skinning block when it is lowered, the skinning block may be provided with a skirt 26 extending around a major portion thereof. This skirt may be of sheet metal and be secured to the skinning block by having an inwardly bent flange 27 around its upper periphery extending between the members 17 and 18 so as to be clamped thereby.

The supporting rods 21 may be guided and supported in bearings 28 secured to a cross member 29 carried by U-shaped subframe members 31 secured to cross members 32 forming part of the table 10. The lower ends of the rods 21 may be suitably secured in a yoke member 33 attached at its central portion to one end of a connecting rod 34. The other end of the connecting rod 34 may be secured to a piston 36 reciprocable in a cylinder 37. The piston and its associated parts including the skinning block 16 may be raised and lowered by fluid pressure, for example by air, steam, or liquid such as water, compressed air being the preferred fluid. The operating fluid may be introduced into and exhausted from the upper end of the cylinder 37 through a pipe 38 and in a similar manner introduced into and exhausted from the lower end of the cylinder through a pipe 39. The pipe 38 may communicate with a port 41 in the casing 42 of a four-way valve 43, shown most clearly in Fig. 5, while the pipe 39 may communicate with a port 44 in the casing 42. An inlet pipe 46 (Fig. 3) from any suitable source of fluid pressure may communicate with a port 47 in the casing 42 and an exhaust pipe 48 (Fig. 3) may communicate with an exhaust port 49 in the valve casing 42.

The valve 43 may also be provided with a plug 51 having opposed control passages 52 so that fluid may be simultaneously introduced into one end of the cylinder 37 and exhausted from the other end. In the position of the valve shown in Fig. 5, fluid under pressure is introduced into the upper end of the cylinder 37 through the pipe 38 and exhausted from the lower end of the cylinder 37 through the pipe 39 and exhaust pipe 48. Rotating the plug 51 of the valve 90° from the position shown will reverse the operation to supply fluid under pressure to the lower end of the cylinder 37 through the pipe 39 and exhaust fluid from the upper end of the cylinder through the pipe 38.

The plug 51 of the valve may be operated in any suitable manner, for example by a rocking foot pedal 53 journaled at 54 on the cover 56 of the valve 43, and having an integral upstanding member 57 provided with a slot 58 receiving a pin 59 on a crank 61 secured to the shaft 62 of the valve plug 51. It will be apparent that the member 53 may be rocked by the foot of the operator from the position shown in Fig. 2 to rock the rotor of the valve 43 90°, thus controlling the operation of the piston 36 and skinning block 16.

The upper surface of the skinning block 16 may have a shape such as that shown in Fig. 1 approximating the outline of a ham and be provided at its larger end with a stop member 63 to assist in positioning the ham upon the skinning block and also assist in holding it in clamped position. The table 10 may also be provided with an upstanding stationary member 64 having a hook shaped end 66 positioned above the smaller end of the skinning block 16. When the small end of the ham is positioned over the narrower end of the skinning block 16, it will be apparent that raising the skinning block with a ham in position thereon will cause the small end of the ham to be clamped between the skinning block 16 and the hook 66 so as to clamp the ham in a fixed position while the operator removes the skin therefrom. The table may also be provided with a waste disposal chute 67 adjacent the skinning block 16 and on the opposite side of the table from the ham receiving member 14. The waste or skin disposal chute 67 may empty into any suitable container or conveying mechanism (not shown). The skinning table may also be provided with a knife box 68, supported upon a member 69 secured to the table 10.

In employing the device of Figs. 1 to 5, the operator stands so as to be adjacent the larger end of the skinning block 16. With the skinning block in its lower position the operator may select a ham or similar article to be worked upon from the conveyor 13 and slide the same with one hand from the conveyor across the member 14 onto the skinning block 16 so as to position the same on the skinning block with the larger end of the ham against the stop member 63 and the small end over the smaller end of the skinning block 16. By actuating the valve operating member 53 by his foot, the operator causes the piston 36 to be raised by fluid pressure, thus raising the skinning block 16 through the connecting rod 34, yoke 33 and rods 21. This causes the ham to be raised to skinning position and also the clamping of the small end of the ham between the skinning block 16 and the hook 66 of the hook member 64. The ham is thus clamped in skinning position and the operator may remove the skin from the ham and dispose of the same along with any other waste through the chute 67. After the skinning operation, reverse actuation of the valve operating member 53 will cause the skinning block 16 to be lowered, after which the operator may slide the skinned ham across the member 14 back onto the conveyor 13, or, if desired, into a suitable container adjacent the table 10. The skirt 26 upon the skinning block 16 prevents the hands of the operator from being caught beneath the skinning block 16 when it is moved from its upper to its lower position, and also prevents foreign material or the material being worked upon from being engaged under the skinning block and interfering with the operation thereof.

A modified holding or clamping device is shown in Figs. 6 to 9, inclusive, in which the structure of the skinning block is simplified, additional holding members for the articles being worked upon are provided, and the elevating and lowering motions of the skinning block are automatically controlled by the removal and replacement respectively of a knife in a knife box. This device includes a table portion 71 supported at one end upon standards 72 and at the other end upon any suitable support such as the rail 73 of a conveyor having a conveying element 74. The table portion 71 may be provided with a ham receiving block 76 of any suitable material such as wood removably secured to the table portion 71 by means (not shown). The table portion 71 may also be provided with a waste disposal chute 77 into which skin, fat or other waste material may be discharged.

A skinning block 78 may be positioned between the ham receiving block 76 and the waste disposal chute 77 and be supported upon a platform 79 secured to the upper end of a piston rod 81 having its lower end received in a fluid pressure cylinder 82 for reciprocation in a vertical direction. The platform 79 secured to the upper end of the piston rod 81 may be and preferably is of metal and the skinning block 78 may be detachably secured thereto by any suitable means (not shown). A metal skirt 83 extends downwards from the sides and the large end of the skinning block 78 so as to have its lower portion below the upper level of the table 71 when the skinning block is in its upper position. This skirt member is preferably provided with an integral metallic top member 84 extending over the platform 79 so as to be secured in position between the skinning block 78 and the platform 79. As the platform 79, skinning block 84 and skirt member 83 are supported upon a single piston rod 81, guide members 86 secured to the table portion 71 are positioned adjacent the skirt member at the wider end of the skinning block 78 to guide the skinning block and associated parts and prevent rotation of the same about the axis of the piston rod 81.

A hook member 88, preferably of T cross section, with the wider portion thereof directed toward the skinning block 78, may be secured to the table 71 so as to have its hook portion positioned above and overlying the narrow end of the skinning block 78. Upon elevation of the skinning block 78 the small end of the ham or other article being worked upon is gripped between the small end of the skinning block 78 and the hook portion of the member 88. The skinning block 78 may be provided with a plurality of stop or positioning members 89, 90 and 91. The positioning members 89 and 90 may be rigidly secured to the skinning block 78, the stop member 89 being secured to the side of the skinning block adjacent the waste disposal chute 77 near the large end of the skinning block 78, and the stop member 90 being secured intermediate the large end of the skinning block 78. The stop members 89 and 90 project a short distance above the upper surface of the skinning block 78.

The stop member 91 is preferably supported so as to be projected above the surface of the skinning block 78 when the skinning block is in its uppermost position and lowered so as to have its upper end flush with or below the upper surface of the skinning block 78 when the skinning block is in its lower position, the upper surface of the skinning block 78 preferably being flush with the ham receiving block 76 when the skinning block is in its lower position. The stop member 91 may extend downwardly through an aperture 92 in the top portion 84 of the skirt member 83 and be provided with a guiding portion 93 received in a pair of guides 94 secured to the inner surface of one side of the skirt member 83. The guide member 93 may have a laterally extending arm member 96 secured thereto for engagement with one end of a lever 97 pivoted intermediate its ends at 98 on the skirt member 83. A compression spring 99 between the arm member 96 and the upper guide member 94 may resiliently urge the stop member 91 toward its lower position. The other end of the lever 97 may be pivotally connected at 101 to a link 102 extending vertically downward through an aperture 103 in a laterally projecting member 104 secured to the cylinder 82. The lower end of the link 102 may be provided with an adjustable abutment 106 shown as a nut, screw threaded upon the lower end of the link 102. In Fig. 8 the nut 106 is in engagement with the laterally projecting member 104 to hold the lever 97 in the position shown, thus holding the stop member 91 in its upper position against the compression of the spring 99. Upon lowering of the skinning block 78 with its associated skirt member 83 the spring 99 lowers the stop member 91 by rocking the lever 97 in a counterclockwise direction, and when the stop member 91 has reached its lowermost position the link 102 slides downwardly through the aperture 103 in the laterally projecting member 104. Upon again raising the skinning block 78 the nut 106 engages the laterally projecting member 104 as the skinning block approaches its upper position, thus rocking the lever 97 to again raise the positioning or stop member 91 to its upper position.

In the upper position of the skinning block 78 all of the stop or positioning members 89, 90 and 91 project a short distance above the upper surface of the skinning block 78 to assist in holding the ham or other article clamped on the skinning block by the hook member 88 securely in working position. The stop members 89, 90 and 91, however, do not project sufficient distance above the upper surface of the skinning block 78 to interfere with the skinning operation. When the skinning block 78 is in its lower position the stop member 91 is withdrawn and the ham or other article on the skinning block is released by the clamping member 88 so that it may be slid to the right in Fig. 6 onto the ham receiving block 76 or the conveyor 74 and another article to be worked upon positioned upon the skinning block by sliding over the ham receiving member onto the skinning block 78 without interference with the stop member 91.

A knife or water box 107 may be suitably secured to the table 71, for example by standards 108. The knife box 107 is preferably positioned adjacent the small end of the skinning block 78 and somewhat above the same when the skinning block is in its upper position. The knife employed in skinning operations is usually a draw knife 109 shown in position in the knife box in Fig. 9 with its handles 111 projecting over the ends of the knife box. A lever 112 pivoted at 113 on the knife box 107 adjacent a rear corner thereof is positioned to be engaged by one of the handles 111 of the knife 109 when the knife is positioned in the knife box. The lever 112 may be pivotally connected intermediate its ends at 114 to a link 115 having its other end pivotally connected at 116 to a control valve operating bell crank 117. The link 115 preferably extends downwardly through an aperture 118 in a member 119 secured to the lower portion of the knife box 107 and the lever 112 and link 115 are resiliently urged to their upper position by a compression spring 121 extending between the member 119 and a collar 122 on the link 115.

The bell crank 117 operates a control valve 123 which may be entirely similar to the control valve 43 shown in Figs. 2, 3 and 5, the connections to the valve being made so that the skinning block 78 is moved to its upper position when the knife 109 is removed from the knife box 107 so that the lever 112 is in its upper position. The skinning block is again moved to its lower position when the knife is replaced in the knife box so as to engage the lever 112 and move it to its lower position. It will be noted that the knife box 101 has its top portion inclined downwardly toward the free end of the lever in Fig. 8 so that the knife tends to slide toward the front of the knife box thus always insuring operation of the lever 112. It will also be noted that the skinning block has a simpler conformation and is of simpler structure than that of Figs. 1 to 4, inclusive.

The operation of the device of Figs. 6 to 9 is similar to that of the device of Figs. 1 to 5, inclusive. However, the device of Figs. 6 to 9 relieves the operator of manually controlling the raising and lowering of the skinning block as this operation is controlled by the necessary act of removing and replacing a knife in a knife support to free the hands for handling the article being worked upon. Also additional stops or positioning members on the skinning block are provided, at least one of which is lowered from its operative position when the skinning block is lowered.

It will thus be seen that I have provided an improved device for assisting in removal of skin from hams or other articles, which device relieves the operator of any lifting of the article being worked upon and which holds the article in position for the operator. The knife ordinarily employed in skinning operations has its ends curved downwardly, necessitating the raising of the ham above the surface of the table. The former operation of manually lifting the ham onto a raised saddle was time consuming as well as fatiguing to the operator, and with the device of the present invention the ham or other article being worked upon is more securely held in working position.

While the invention has been specifically described with respect to skinning hams, it is apparent that the device of the present invention may be employed for clamping other meat products, as well as any other article which it is desired to hold in position while being worked upon. Thus the shape of the supporting member 16, as well as the form of the clamping member 66, may be varied to fit the article being handled.

While I have disclosed the preferred embodiment of my invention, it is understood that the details thereof may be varied within the scope of the following claims.

I claim:

1. A device for positioning and holding articles being worked upon, which comprises, a vertically movable supporting member having a lower position and an upper position, a clamping member having a clamping portion overlying a limited area of said supporting member, said limited area being disposed at one end of said vertically movable supporting member, and means for raising the supporting member with an article thereon from its lower position to its upper position in order to clamp a portion of said article between said supporting member and said clamping member with the entire remainder of the article supported by and exposed upon said supporting member whereby the principal part of its surface is exposed and held in a position to be worked upon.

2. A device for positioning and holding articles being worked upon, which comprises, a vertically movable supporting member having a lower position and an upper position, a clamping member having a clamping portion overlying a limited area of said supporting member, said limited area being disposed at one end of said vertically movable supporting member, power operated means for raising said supporting member with an article thereon from its lower position to its upper position in order to clamp a portion of said article between said supporting member and said clamping means with the entire remainder of the article supported by and exposed upon said supporting member whereby the principal part of its surface is exposed and held in a position to be worked upon, and means under control of the operator for actuating said power operated means.

3. A device for positioning and holding articles being worked upon, which comprises, a table member, a vertically movable supporting member having a lower position and an upper position, the upper surface of said supporting member being substantially flush with the upper surface of said table member when said supporting member is in its lower position, a clamping member attached to said table member and extending upwardly therefrom with a portion of the clamping member overlying a limited area of said supporting member, said limited area being disposed at one end of said vertically movable supporting member, and means for raising said supporting member with an article thereon from its lower position to its upper position in order to clamp a portion of said article between said supporting member and said clamping member with the entire remainder of the article supported by and exposed upon said supporting member whereby the principal part of its surface is exposed and held in a position to be worked upon.

4. A device for positioning and holding articles being worked upon, which comprises, a table member, a vertically movable supporting member having a lower position and an upper position, the upper surface of said supporting member being substantially flush with the upper surface of said table member when said supporting member is in its lower position, a clamping member attached to said table member and extending upwardly therefrom with a portion of the clamping member overlying a limited area of said supporting member, said limited area being disposed at one end of said vertically movable supporting member, fluid pressure means for raising the supporting member with an article thereon from its lower position to its upper position in order to clamp a portion of said article between said supporting member and said clamping member with the entire remainder of the article supported by and exposed upon said supporting member whereby the principal part of its surface is exposed and held in a position to be worked upon, and means under control of said operator for actuating said power means to raise said supporting member.

5. A device for positioning and holding articles being worked upon, which comprises, a table member, a movable supporting member having a lower position and an upper position, said table member having an opening for receiving said supporting member in its lower position, the upper surface of said supporting member being substantially flush with the upper surface of said table member when said supporting member is in its lower position, a clamping member secured to said table member and having a portion overlying a limited area of said supporting member, means including a fluid pressure cylinder for raising said supporting member with an article thereon from its lower position to its upper position in order to clamp a portion of said article between said supporting member and said clamping member, said supporting member having a downwardly extending skirt around at least a major portion of its periphery to close said opening when said supporting member is in its upper position.

6. A device for positioning and holding hams during skinning of said hams, which comprises, a table member, a vertically movable supporting member having an outline generally conforming to the outline of a ham and having a small end and a large end, a clamping member having a hook portion supported above the small end of said supporting member, and means for raising said supporting member with a ham thereon from its lower position to its upper position in order to clamp the small end of said ham between said supporting member and said clamping member.

7. A device for positioning and holding hams during a skinning operation thereon, which comprises, a table member having an opening therein and provided with a ham receiving portion, a clamping member fixedly supported above the table in spaced relation thereto, a movable supporting member having a lower position and an upper position, said supporting member having an outline generally conforming to the outline of a ham and having a small end and a large end, said supporting member being received within and substantially conforming to the shape of said opening and having its upper surface substantially flush with the upper surface of said ham receiving portion when said supporting member is in its lower position, a fluid pressure cylinder provided with a piston positioned below said supporting member, said supporting member being connected to said piston, and means under control of the operator for supplying fluid pressure to said cylinder for raising said supporting member to its upper position in order to clamp the smaller end of said ham between said supporting member and said clamping member.

8. A device for positioning and holding articles being worked upon, which comprises, a vertically movable supporting member having a lower position and an upper position, a clamping member having a clamping portion overlying a limited area of said supporting member, power operated means for raising said supporting member with an article thereon from its lower position to its upper position in order to clamp a portion of said article between said supporting member and said clamping means, a support for a tool employed upon said article and means for actuating said power operated means for raising said supporting member upon removal of said tool from said support and lowering said supporting member upon replacing said tool upon said support.

9. A device for positioning and holding articles being worked upon, which comprises, a movable supporting member having a lower position and an upper position, a clamping member having a portion rigidly supported above said supporting member, means for raising the supporting member with an article thereon from its lower position to its upper position in order to clamp said article between said supporting member and said clamping member, a positioning member for said article supported adjacent the periphery of said supporting member and extending above the upper surface of said supporting member when said supporting member is in its upper position and means for lowering said positioning member below the upper surface of said supporting member when said supporting member is moved to its lower position.

10. A device for positioning and holding hams during skinning of said hams, which comprises, a table member, a vertically movable supporting member having an outline generally conforming to the outline of a ham and having a small end and a large end, a clamping member having a hook portion supported above the small end of said supporting member, means for raising said supporting member with a ham thereon from its lower position to its upper position in order to clamp the small end of said ham between said supporting member and said clamping member, a plurality of ham positioning members adjacent the periphery of said supporting member, said positioning members extending above the upper surface of said supporting member, means for lowering said supporting member to release said ham from said clamping member and means for lowering at least one of said positioning members below the upper surface of said supporting member when said supporting member is lowered.

THOMAS J. C. CHAPMAN.